March 13, 1956  A. VAUGOYEAU  2,738,205
AUXILIARY SAFETY COUPLING DEVICE FOR A
SEMI-TRAILER WITH CIRCULAR
FIFTH-WHEEL PLATE Filed Feb. 26, 1953  2 Sheets-Sheet 2

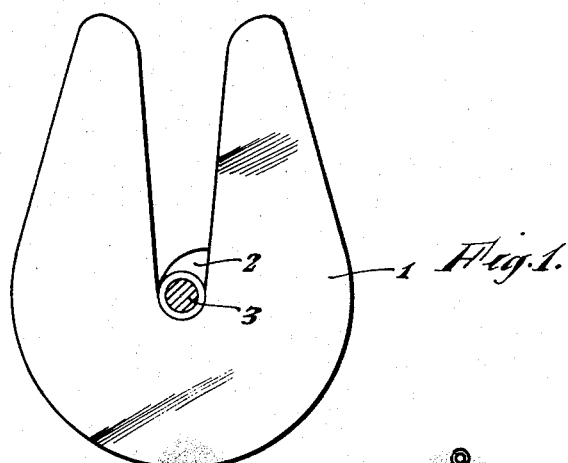
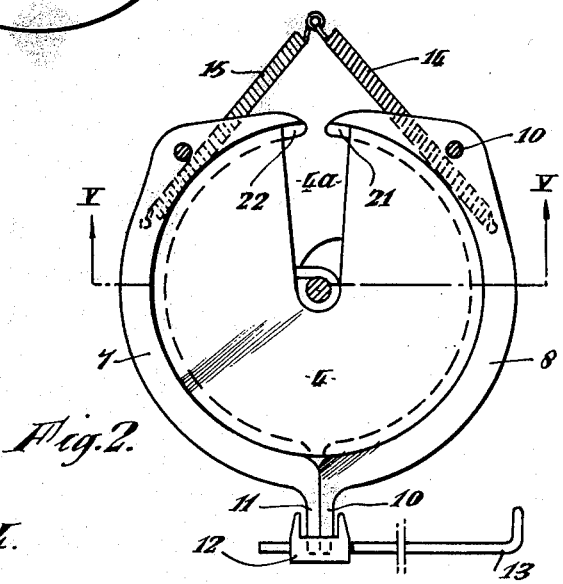
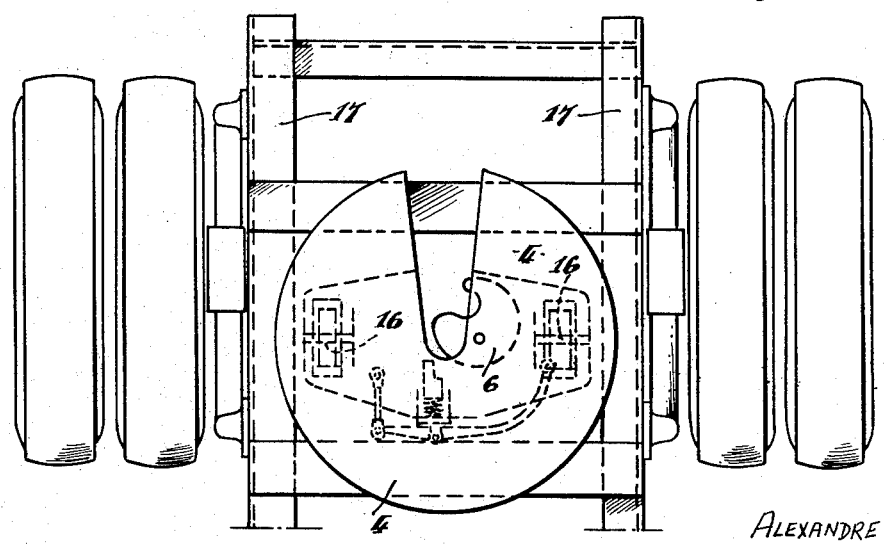

INVENTOR:-
ALEXANDRE VAUGOYEAU

By:- Chatwin & Company
ATTYS.

United States Patent Office 2,738,205
Patented Mar. 13, 1956

2,738,205

AUXILIARY SAFETY COUPLING DEVICE FOR A SEMI-TRAILER WITH CIRCULAR FIFTH-WHEEL PLATE

Alexandre Vaugoyeau, Marseille, France

Application February 26, 1953, Serial No. 339,086

1 Claim. (Cl. 280—432)

This invention relates to fifth wheel assemblies of the kind commonly employed to couple tractors and trailers, its object being to provide improved means for positively maintaining the tractor and trailer plates in operative position in the event of breakage of the king-pin.

Figure 3:
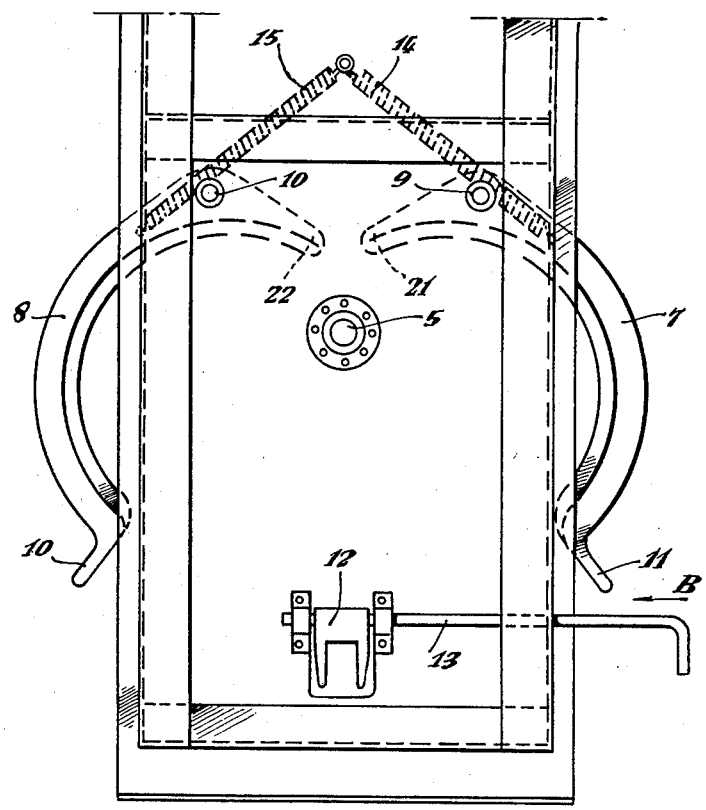
Figure 5:
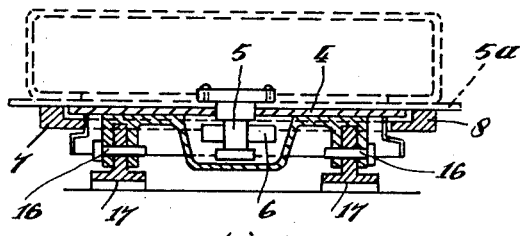

An embodiment of the invention is illustrated in the accompanying drawing, wherein:

Figure 1 shows in plan view, and by way of comparison, a form of coupling device commonly used and not having any additional securing means, Figs. 2 and 3 represent, respectively in plan and underplan, the additional coupling means of the present invention respectively in closed and open positions, Fig. 4 is a plan view of part of a tractor vehicle; Fig. 5 is a section taken on the line V—V of Fig. 2.

The couplings of current type according to Fig. 1, given by way of comparison, comprise a tractor plate 1 with a centering opening and a locking device 2 mounted on the tractor for securing in position a king-pin 3 mounted on the trailer vehicle.

The known main coupling means of Figs. 2, 3 and 4 is constituted by similar members, but the tractor plate 4 carried by pivots 16 on a tractor chassis 17 is circular with a radial recess 4a for guiding and centering the king-pin 5, which depends from the trailer plate 5a.

The king-pin 5 can be locked in axial position by the known locking means 6, but additionally the tractor plate 4 is encircled and secured by an additional coupling means.

The additional coupling means is formed by two semicircular retaining arms 7 and 8 pivoted near one end on two pivots 9 and 10 mounted spaced symmetrically to the rear of the king-pin on the trailer plate. Said arms are disposed adjacent to the trailer plate with their common plane parallel to the plane of the trailer plate. These two arms 7 and 8 terminate at their other end in lugs 10 and 11. A clamp 12 pivoted on the trailer plate can be actuated by the handle 13 to retain the lugs 10 and 11 together, or again to allow them apart. Springs 14 and 15 are coupled to the arms and to the trailer plate in such positions as to urge the arms to snap completely together and completely apart.

When the trailer is uncoupled, the arms 7 and 8 are kept separated by the springs 14 and 15 in the position indicated in Fig. 3. At the moment of coupling when the tractor comes up to the trailer vehicle, the tractor plate 4 abuts against the extremities 21 and 22 of the arms 7 and 8. As the tractor plate 4 moves further inwardly, the arms encircle the tractor plate 4 to a greater and greater extent until the arms engage about substantially the entire periphery of the tractor plate which is coaxial with the trailer plate. At this time the two lugs 10 and 11 enter into contact, whilst the king-pin 5 is locked in known manner. It is then only necessary to engage the clamp 12 down onto the two lugs 10, 11 to lock them together, and maintain the arms in their position of peripheral encirclement. The tractor plate is thereby secured against displacement radially with respect to the king-pin but can rotate about the king-pin.

I claim:

A coupling device for a tractor and a semi-trailer vehicle comprising a trailer plate and a king-pin depending therefrom, a tractor plate having a circular periphery and a radial slot extending forwardly from the periphery to receive the king-pin in axial position, means on the tractor plate for releasably holding the king-pin in said axial position, two semi-circular retaining arms disposed adjacent the trailer plate with their common plane parallel to the plane of the trailer plate, two pivots mounted on the trailer plate and symmetrically spaced apart and to the rear of the king pin, said pivots each having one of the retaining arms pivoted on it near one end such that when the tractor plate is positioned with the king-pin axially therein said arms engage about substantially the entire periphery of the tractor plate and thus secure the tractor plate against displacement radially with respect to the king-pin while permitting rotation about the king-pin, and means on the trailer plate for releasably locking together the other ends of said retaining arms in engaged position about the tractor plate.

References Cited in the file of this patent

UNITED STATES PATENTS

| | | |
|---|---|---|
| 2,108,307 | Da Valle | Feb. 15, 1938 |
| 2,166,308 | Logan | July 18, 1939 |
| 2,450,201 | Logan | Sept. 28, 1948 |
| 2,619,359 | Pyle et al. | Nov. 25, 1952 |